March 17, 1936.  T. W. LANGER  2,034,685

PROCESS FOR PRODUCING UNIFORM EPSOM SALT CRYSTALS

Filed July 27, 1933   3 Sheets-Sheet 1

THEODORE W. LANGER
INVENTOR

BY R. J. Dearborn
HIS ATTORNEY

March 17, 1936.   T. W. LANGER   2,034,685
PROCESS FOR PRODUCING UNIFORM EPSOM SALT CRYSTALS
Filed July 27, 1933   3 Sheets-Sheet 2

THEODORE W. LANGER
INVENTOR
BY
HIS ATTORNEY

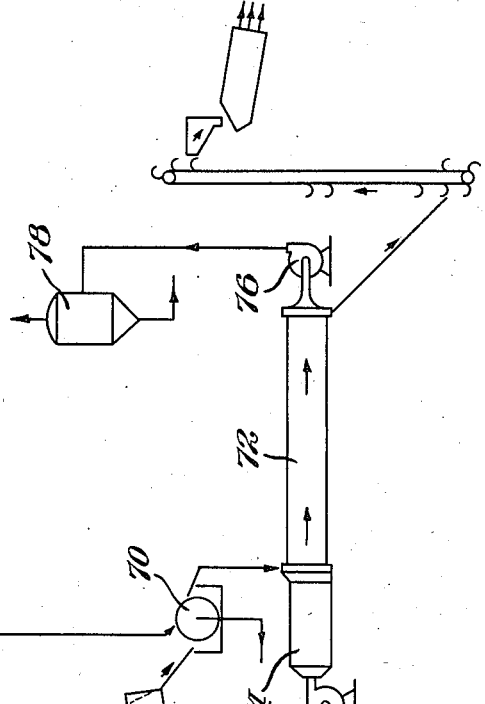
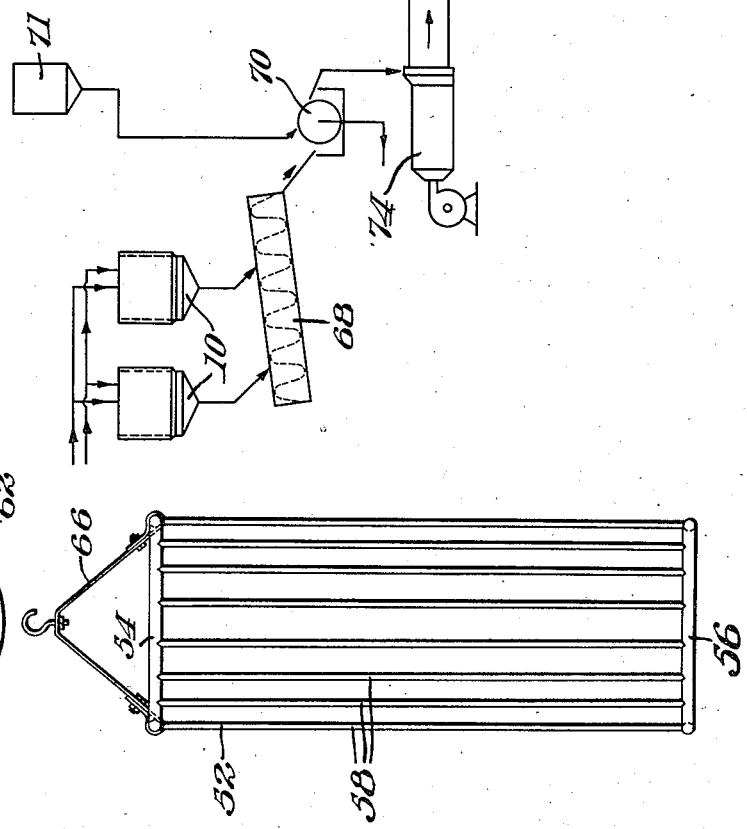
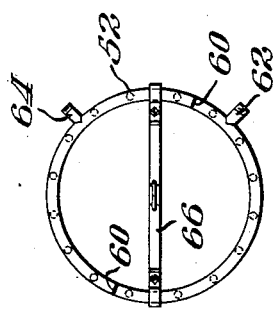

Patented Mar. 17, 1936

2,034,685

UNITED STATES PATENT OFFICE 2,034,685

PROCESS FOR PRODUCING UNIFORM EPSOM SALT CRYSTALS

Theodore W. Langer, Tulsa, Okla., assignor to Texaco Salt Products Company, New York, N. Y., a corporation of Delaware Application July 27, 1933, Serial No. 682,453

4 Claims. (Cl. 23—128)

This invention relates to an improved process and apparatus for producing high grade needle crystals of materials, such as Epsom salts, to produce a product satisfactory both in chemical purity and physical appearance.

The invention is particularly applicable to the crystallization of Epsom salts (magnesium sulphate heptahydrate — $MgSO_4.7H_2O$). During crystallization of this material the concentration and temperatures of the solution must be carefully noted and correlated to the state of agitation of the solution to provide the proper formation of seeding crystals and also during crystal growth on the preformed crystals. The temperature at which this solution is maintained, the pouring temperature and initial and later crystallizing temperatures are accordingly all of considerable importance in forming satisfactory crystals.

According to the present invention the solution is concentrated as high as possible and since magnesium sulphate heptahydrate is unstable above 119.6° F., the possible concentration is limited, otherwise crystals would form above that temperature. A solution of magnesium sulphate having a specific gravity of 1.383 has been found to be substantially saturated at 119° F.

The solution of this concentration may be maintained at a temperature of approximately 120° to 125° F. immediately before pouring. When the solution has been poured into the crystallizing vessel the temperature is preferably about 121° F. After the solution is entirely quiet it is gradually cooled by heat transfer, preferably by the use of removable water coils immersed in the solution, the water temperature being from 60° to 80° F. At the end of from four to six hours the temperature may drop to 110° F. or lower and needles begin to form and settle to the bottom of the vessel. The cooling water may now be turned off and settling will proceed for one to two hours without further cooling, the crystallization being sufficient to completely remove the supersaturation for this temperature.

Naturally, during the crystallization some crystals form on the cooling coils. For this reason and in order to produce substantially uniform crystals, the cooling coils and all firmly adhering crystals are removed from the crystallizing chamber and the solution is thereafter further cooled with agitation. The agitation may be either mechanical scraping and stirring or air agitation at various points in the crystallizing vessel, or preferably both means of agitation are employed. Where the supplemental cooling is provided through the use of a cooling jacket around the crystallizing vessel it has been found that scraping the sides of the vessel does not cause the formation of deformed crystals to an objectionable extent but instead most of the crystal growth is on the preformed crystals produced during the quiescent settling stages while the cooling coils were employed. After from five to eight hours the thin needles will have grown to several times their initial diameter, long needles of substantial diameter being the desired form to be produced in accordance with the present invention. The mother liquor is then siphoned overhead and refortified with crystals for reuse as long as it remains sufficiently pure. Thereafter the Epsom salt crystals are drained or pumped as a heavy slurry from the bottom of the vessel, the crystals being dewatered, washed and dried.

It is preferred to dry the crystals by means of a parallel flow of heat as the crystals are gradually advanced through a rotary drier since it is found that in this way decomposition or change in the hydrate form of the substance is avoided, yet the drying is sufficiently complete to permit the crystals to be immediately screened and packaged.

The process involved will be clear from the description of the construction and operation of the apparatus disclosed in the drawings, illustrating one preferred adaptation of suitable mechanical devices for carrying out the invention.

In the drawings:

Fig. 4 is an elevational view of one of the cooling coils removed from the apparatus.

Fig. 5 is a plan view of the cooling coil.

Fig. 6 is a diagrammatic view, in the nature of a flow chart, illustrating the precipitation and further treatment of the salts.

Figure 1:
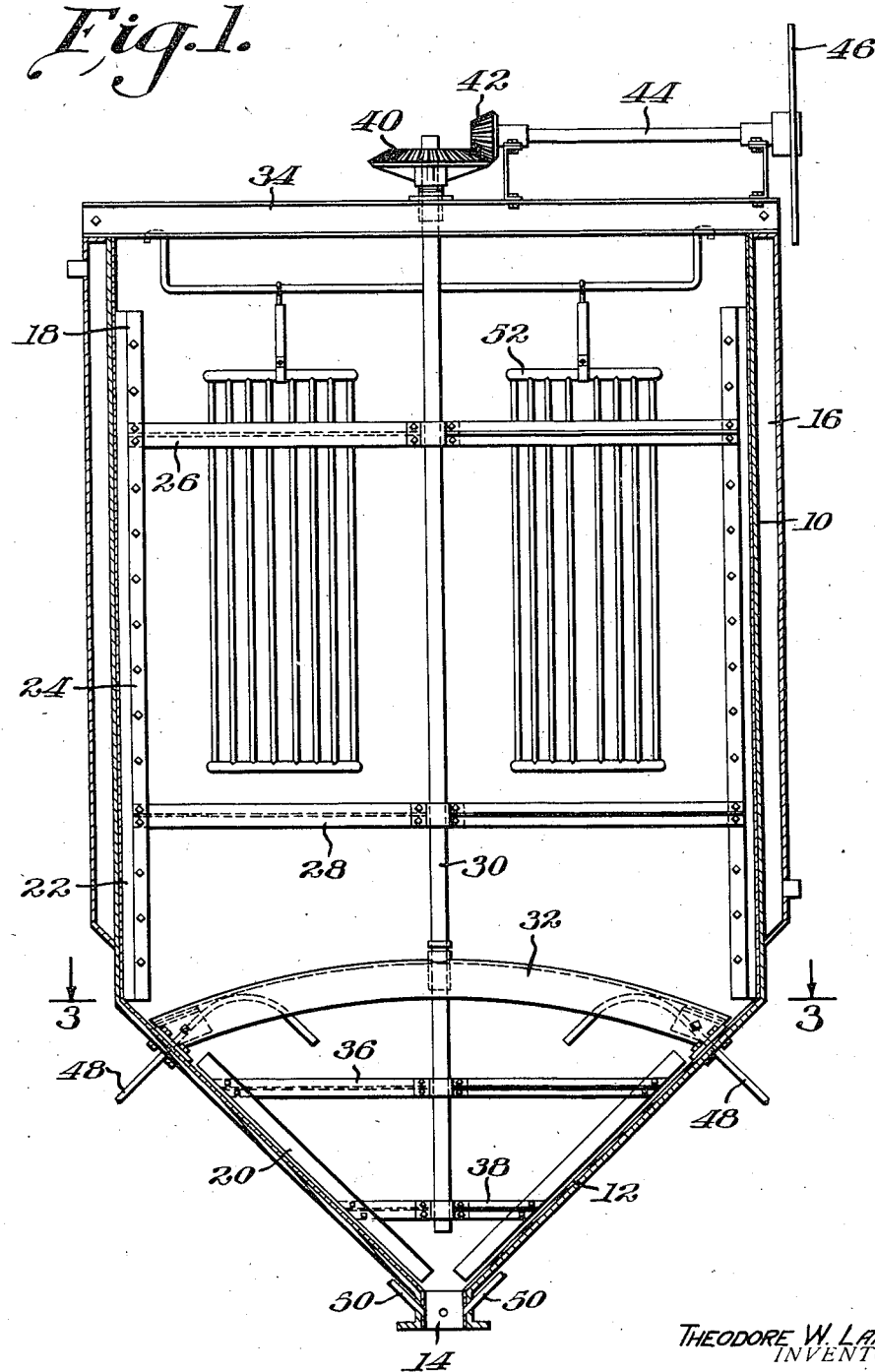
Fig. 1 is a vertical sectional view of a crystallizing receptacle.
Figure 2:
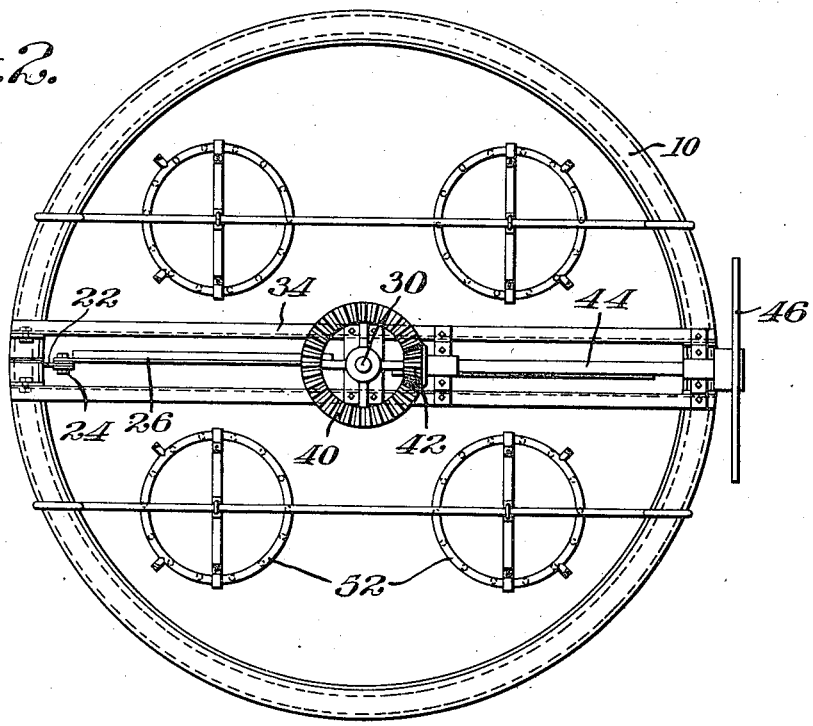
Fig. 2 is a plan view of the same.
Figure 3:
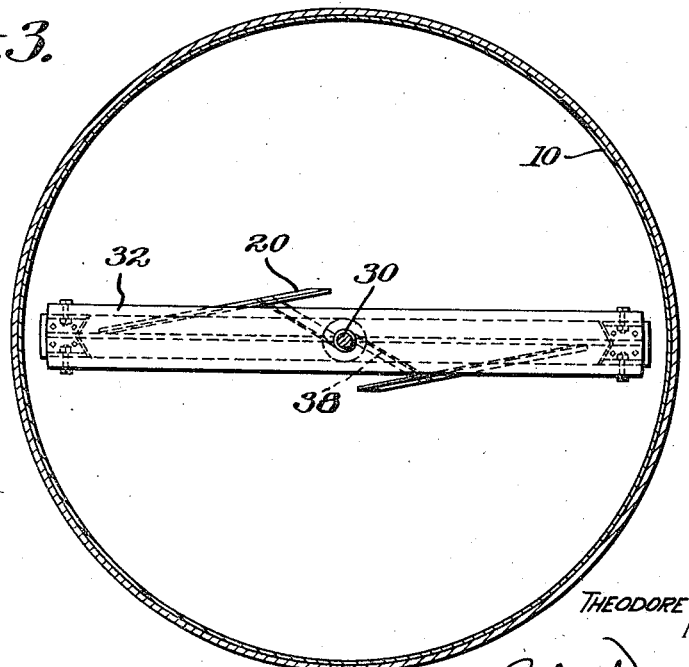
Fig. 3 is a horizontal sectional view taken on the line 3—3 of Fig. 1.

The crystallizer disclosed in the present apparatus includes a cylindrical vessel 10 having a conical bottom 12 formed with a discharge outlet 14 at the vortex of the cone. The main body of the receptacle 10 is formed with a double wall, as shown at 16, to permit the application of cooling liquid to the outer wall of the receptacle. The inner wall of the receptacle 10 and conical bottom 12 may be lined with a material resistant to corrosion, such, for example, as Monel metal, stainless steel, porcelain and the like. During a certain period in the operation of the apparatus, it is preferable to maintain the walls free of adhering crystals. This is accomplished by providing scrapers 18 for the side walls and stirrers 20 for the conical bottom of the receptacle. The opposed scrapers 18, as shown, are formed with wood or rubber contact members 22, supported in the vertical frames 24, the latter being carried by cross-members 26 and 28 secured to a vertical supporting shaft 30. The shaft 30 is supported in suitable bearings in the lower cross-frame 32 and the upper cross-frame 34. The stirrers 20 may be similarly supported upon the vertical shaft 30 or upon a separate shaft passing through the latter. The blades or stirrers 20 may be maintained slightly out of contact with the adjacent conical surface. These blades are supported at the upper outer ends by means of a rigid cross-bar 36. The lower inner ends of the blades are attached to an adjustable lever 38, movable to various angular positions, as shown for example in Fig. 3, so that the blades 20 may be given an angular position, such as to tend to move the precipitated salts downwardly toward the outlet at the base of the cone.

The shaft 30 is rotated by any suitable driving mechanism, shown by way of example as gears 40 and 42, drive shaft 44 and sprocket or disc driving wheel 46. If a separate drive is provided for the scrapers 20 and supports, the gears 40, 42, etc., may be duplicated.

Air is introduced into the lower porton of the crystallizing receptacle in order to assist in maintaining the desired agitation in the solution and to tend to maintain the precipitated salts suspended in the solution. One set of air tubes 48 opens into the receptacle at a level near the base of the cylindrical wall of the vessel. Another set of tubing 50 opens directly into the outlet spout 14 in order to prevent packing of the precipitated salts at this point. It will be understood that any desired number of air tubes may be provided in each set, four being shown in each instance in the present apparatus.

The removable cooling coils 52 are introduced into the upper open end of the crystallizing chamber. These coils are preferably formed mainly of vertical pipes with a minimum of horizontal cooling surfaces for receiving and holding precipitated crystals. Thus the coils are formed with an upper tubular ring 54 and a lower ring 56 connected by conducting tubes 58, the rings 54 and 56 operating as manifolds for receiving the tubes 58 communicating therewith. The upper ring 54 is closed by the transverse plates 60 so as to divide this manifold into two sections formed with hose connections 62 and 64, through which water or other cooling fluid may be introduced and discharged after circulating through the coils. The several cooling coils are supported in the upper section of the crystallizing chamber as by means of the supporting brackets 66.

Referring now to Fig. 6, it will be understood that any desired number of crystallizing receptacles 10, as described above, may be provided and the salts discharged through the bottom openings 14 into a suitable conveyor 68, through whch the heavy Epsom salt slurry is conveyed to the filter 70. This filter may be of any usual type wherein the crystals are washed with a substantially pure Epsom salt solution received from the tank 71, all excess liquid being removed from the crystals as by means of a centrifugal separator. The crystals are thereafter carried to a drier 72 in which the crystals are thoroughly dried by parallel heat flow wherein the gases pass through the drier in the same direction as the crystals. The drier may be formed with the usual advancing blades for elevating and dumping the crystals periodically as they are carried through the drier, heat being supplied from the burner 74 at the admission end of the drier. The heat escapes through the forward end of the drier, the vapors being removed and dust collected by means of a suction pump 76 and collector 78. The dried needles are then conducted to suitable conveying apparatus for transferring the crystals to the screening and packaging apparatus. If preferred, the powdered salt received in the dust collector may be used for forming the wash solution in the tank 71.

In carrying out the process with the above disclosed apparatus, the following is stated as one preferred method of operation. A quantity of well-filtered chemically pure Epsom salt solution at about 125° F., whose specifice gravity is 1.380 at 130° F. (1.382 at 125° F.), is charged to the clean crystal-free crystallizers, each with the four cooling coils in position. When the filling is completed, this operation requiring from 15 to 30 minutes, the solution temperature may be approximately 121° F. Water at from 60° to 80° F. is then run through the cooling coils while the solution is maintained in the state of perfect calm and without other artificial cooling. After 4 to 6 hours the temperature drops to approximately 110° F. and relatively long thin needles form and settle to the conical bottom. The cooling water passing through the coils 52 is now turned off and settling proceeds for from 1 to 2 hours without further cooling in order to completely remove supersaturation. Since the coils 52 are vertical, a minimum of needles will settle on the coils. From 600 to 800 pounds of crystals will settle to the bottom of the receptacle.

These coils are now hoisted out of the receptacle and the solution is further cooled with agitation. Water is run through the jacket surrounding the cylindrical portion of the vessel, the scraping and stirring paddles are started in operation and the air turned on in the two sets of air pipes in sufficient quantity to maintain the needles suspended in the solution. The paddles may be rotated at a very slow rate, only a few revolutions per minute being required to maintain sufficient mechanical agitation and scraping on the walls. In from 5 to 8 hours the initial thin needles will have grown to several times their initial weight and the batch is harvested. The mother liquor is then removed as by being siphoned or pumped overhead and may be refortified with crystals as long as sufficiently pure. The crystals are drained as a heavy slurry through the bottom of the receptacle, conveyed to a dewatering apparatus, such as the rotary filter disclosed, washed with a solution of Epsom salt and conducted to the rotary drier where the crystals are dried with parallel flow of heat. Thereafter they are screened for size and packaged.

It will be noted that in the above operation, the solution is maintained absolutely calm during the initial crystal formation as the solution is cooled by heat transfer coils. These coils and deformed crystals formed on the same are removed from the solution to prevent growth of these crystals. Since the cooling jacket is only operated after the solution has been seeded with proper crystals, the cooling extending only for the length of the cylindrical portion of the receptacle, further growth of the crystals en masse is prevented. The slope of the conical bottom of the receptacle is greater than the angle of repose of the Epsom salt so that the crystals tend to slide downwardly, assisted by the agitating effect of the stirrers 20.

The scrapers on the side of the vessel are not considered entirely essential but improve the heat transfer after the cooling water is supplied to the jacket. The air vents at the bottom of the cone and in the upper part of the cone serve to maintain the needles in suspension. Each needle is thus afforded an opportunity for growth so that the needles become more or less uniform in size and furthermore the formation of granular crystals is to a large extent prevented.

It will be understood that various modifications may be made in the apparatus and its use in carrying out the process. For example, the mother liquor may be drained after the calm cooling of the solution and the tank thereafter charged with a more concentrated solution. In this case the added solution may be of greater specific gravity than 1.380 at 130° F. since the seed crystals, which determine the final shape, have already been formed. There is a greater tendency for the preformed seed crystals to grow than for new crystals to form. The scraper 18 and stirrer 20 may be separately operated so that their speeds may vary independently. Some cooling on the surface through the use of the water jacket during the quiet cooling stage may be practiced but this is not preferred because of the objectionable number of crystals which would be formed on the wall and maintained in the solution. Continuous air agitation may be used if sufficiently light initially, the air flow being increased in the later stages. Too great a quantity of air initially, however, would cause the formation of defective short needles.

Obviously many modifications and variations of the invention, as hereinbefore set forth, may be made without departing from the spirit and scope thereof, and therefore only such limitations should be imposed as are indicated in the appended claims.

I claim:

1. The process of forming crystals of magnesium sulphate comprising cooling the solution by heat transfer devices while maintaining the same under relatively quiescent conditions until crystallization begins, removing the cooling devices and firmly adhering crystals, and cooling the solution with agitation during further crystal growth.

2. The process of forming salt crystals from concentrated brine comprising cooling the brine by direct contact with heat transfer devices to a point where crystallization occurs, continuing the cooling by said heat transfer devices during crystal formation and thereafter removing the crystals formed on said heat transfer devices, and finally cooling the brine further while agitating the same for maintaining crystals in suspension therein.

3. The process of forming crystals of magnesium sulphate from solution comprising introducing the solution into a crystallizing chamber at a temperature above 119.6° F., cooling the solution to below 119.6° F. by heat transfer coils while maintaining the same at substantially atmospheric pressure and in a quiescent state, removing the heat transfer coils and firmly adhering crystals, cooling the solution further with agitation and removing the precipitated crystals.

4. The process of crystallizing substantially pure magnesium sulphate from solution comprising introducing magnesium sulphate solution, having a specific gravity of approximately 1.383, at a temperature between 119.6° and 135° F. into a clean crystal-free crystallizer, cooling the solution to a temperature below 119.6° F. by removable heat transfer devices to produce supersaturation while maintaining the same relatively quiescent until substantial crystal formation occurs, interrupting the cooling and maintaining the solution and crystals under relatively quiescent conditions until supersaturation is removed, removing the cooling devices and firmly adhering crystals from the solution, cooling the solution further while agitating the same with mechanical and air agitation, separating the crystals so formed from the mother liquor and drying the same by parallel flow of heated gas.

THEODORE W. LANGER.